United States Patent [19]

Honda et al.

[11] Patent Number: 4,686,145
[45] Date of Patent: Aug. 11, 1987

[54] MAGNETIC RECORDING MEDIUM, A PROCESS FOR PREPARING A MAGNETIC RECORDING MEDIUM AND A BINDER COMPOSITION THEREFOR

[75] Inventors: Masaru Honda; Takanori Chiba; Toshiaki Imokawa, all of Niihama; Yoshito Harada, Takarazuka; Katsumi Nagayasu, Amagasaki, all of Japan

[73] Assignee: Sumitomo Bayer Urethane Co., Ltd., Amagasaki, Japan

[21] Appl. No.: 830,763

[22] Filed: Feb. 19, 1986

[30] Foreign Application Priority Data

Mar. 1, 1985 [JP] Japan ................................ 60-40792
Mar. 1, 1985 [JP] Japan ................................ 60-40793

[51] Int. Cl.$^4$ ............................................. G11B 5/702
[52] U.S. Cl. ............................ 428/425.9; 252/62.54; 427/128; 428/694; 428/900
[58] Field of Search .................... 428/694, 425.9, 695, 428/900; 252/62.54; 427/128, 131; 360/134–136

[56] References Cited

U.S. PATENT DOCUMENTS

| | | | |
|---|---|---|---|
| 3,401,151 | 9/1968 | Weiden | 528/45 |
| 4,152,485 | 5/1979 | Mizumura | 428/64 |
| 4,404,253 | 9/1983 | Kohler | 428/327 |
| 4,423,115 | 12/1983 | Tokuda et al. | 428/425.9 |
| 4,501,795 | 2/1985 | Takeuchi et al. | 428/425.9 |
| 4,521,486 | 6/1985 | Ninomiya | 428/407 |
| 4,529,661 | 7/1985 | Ninomiya | 428/329 |
| 4,567,108 | 1/1986 | Lehner et al. | 428/425.9 |
| 4,571,364 | 2/1986 | Kasuga | 428/425.9 |
| 4,607,068 | 8/1986 | Ansel | 428/694 |
| 4,613,545 | 9/1986 | Chubachi | 428/425.9 |
| 4,634,633 | 1/1987 | Ninomiya | 428/425.9 |
| 4,637,959 | 1/1987 | Ninomiya | 427/131 |

FOREIGN PATENT DOCUMENTS

| | | |
|---|---|---|
| 142798 | 5/1985 | European Pat. Off. . |
| 2833845 | 2/1979 | Fed. Rep. of Germany . |
| 3239160 | 5/1983 | Fed. Rep. of Germany . |
| 3411880 | 10/1984 | Fed. Rep. of Germany . |

*Primary Examiner*—Ellis P. Robinson
*Attorney, Agent, or Firm*—Connolly and Hutz

[57] ABSTRACT

A novel magnetic recording medium consisting of a base material, magnetic particles and a specific polyurethane-based binder containing incorporated sulphonate groups, a process for preparing such a magnetic recording medium which comprises coating a base material with a coating material comprising (i) an organic solvent, (ii) a polyurethane binder containing chemically incorporated sulphonate groups and (iii) magnetic particles and the most preferred binder composition therefor comprising a hexandiol-(1,6)-polycarbonate-based polyurethane.

3 Claims, No Drawings

MAGNETIC RECORDING MEDIUM, A PROCESS FOR PREPARING A MAGNETIC RECORDING MEDIUM AND A BINDER COMPOSITION THEREFOR

The present invention relates to a magnetic recording medium consisting of a base material, magnetic particles and a binder comprising a specific polyurethane resin, to a process for preparing such a magnetic recording medium and to a binder composition therefor comprising a polyurethane resin containing chemically fixed sulphonate groups based on hexane diol-(1,6)-polycarbonate with terminal hydroxyl groups.

The binders which are used for the manufacture of magnetic recording media are usually based on plastic materials such as ethyl-cellulose, nitro-cellulose, polyvinylchloride, polyvinylidenechloride, vinylchloridevinylacetate copolymers, styrene-butadiene copolymers, polyarcylate resins, vinylidenechloride-methylmethacrylate copolymers, epoxy resins or polyester resins. However, these binders lead to tapes whose abrasion resistance is often insufficient for applications such as data recording tapes for computer or video recording tapes in which a very high performance is required. In order to improve the abrasion resistance and durability polyurethane resins have also been used as binders, however these binders have often an unsufficient dispersing property for the magnetic particles. It has already been tried to improve the dispersion properties of such polyurethane binders by introducing metal salts of sulphonic acis (Japanese Patent Applications, laying-open Nos. SHO 54-157603, 57-165464 and 57-92423). However, these salts have an unsufficient compatibility with the usual polyester polyols which are used for the manufacture of these polyurethane resins. Furthermore, the presence of such salts in the polyurethane leads to a decrease of the storage stability of the polyurethane resin composition.

It was, therefore, the object of the present invention to provide a new binder for magnetic recording media which combines an improved abrasion resistance and durability with excellent dispersing properties for the magnetic particles.

This object was accomplished in accordance with the present invention by providing an new magnetic recording medium as explained in more detail hereinafter, a new process for preparing a magnetic recording medium as disclosed in more detail hereinafter and by providing a new binder composition therefor as disclosed in more detail hereinafter.

The present invention relates to a magnetic recording medium consisting of a base material, magnetic particles and a binder, characterised in that said binder comprises a polyurethane resin containing chemically fixed sulphonate groups.

The present invention also relates to a process for preparing a magnetic recording medium which comprises coating a base material with a coating material comprising (i) an organic solvent, (ii) a polyurethane binder and (iii) magnetic particles, characterised in that the polyurethane binder contains chemically incorporated sulphonate groups in an amount of from 10 to 200 equivalents per 1000 kg.

The present invention also relates to a binder composition comprising a polyurethane resin which has been obtained by reacting (a) a polyisocyanate component with (b) a polyol component comprising (i) a hexane diol(1,6)-polycarbonate having terminal hydroxyl groups and having a molecular weight of from 400 to 10,000, (ii) a diol chain extender which does not contain sulphonate groups and which has a molecular weight of from 62 to 399 and (iii) an alkali metal salt of an alkane diol sulphonate and/or alkali metal salt of an alkylene oxide adduct of an alkane diol sulphonate in an amount such that the resulting polyurethane contains from 10 to 200 equivalents of sulphonate groups per 1000 kg optionally in the presence of (c) auxiliaries known in polyurethane chemistry.

The novel magnetic recording medium consists of the usual base materials, magnetic particles and a specific binder.

The base material corresponds to the base materials which are normally used for magnetic recording media. For example they may consist of films or sheets of polyethylene therephthalate for applications such as recording tapes or floppy discs or of paper for applications such as traffic tickets.

The magnetic particles as well correspond to the magnetic particles which are commonly used for the manufacture of magnetic recording media. Suitable magnetic particles have generally a coercive force of from 300 to 1000 Oe and an average particle size of from 0.1 to 2 $\mu$m. They may consist, for example, of cobalt-free or cobalt-doped iron oxides such a $\psi$-$Fe_2O_3$ or $Fe_3O_4$, of iron or iron-based pigments or of chromdioxide.

The binder which is essential in accordance with the invention essentially consists of a polyurethane which is made of reacting (a) a polyisocyanate component with (b) a polyol component, optionally in the presence of (c) auxiliaries known in polyurethane chemistry.

The polyisocyanate component a) may consist of any organic polyisocyanate known in polyurethane chemistry or of mixtures of different organic polyisocyanates. Among the preferred polyisocyanates are 2,4-tolylene diisocyanate and/or 2,6-tolylene-diisocyanate, p-phenylene -diisocyanate, m-phenylene diisocyanate, 4,4'-diphenylmethane-diisocyanate, hexamethylene diisocyanate, tetramethylene-diisocyanate, 3,3'-dimetoxy-4,4'-biphenylene diisocyanate, 2,4-naphtalene diisocyanate, 3,3'-dimethyl4,4'-biphenylene diisocyanate, 4,4'-biphenylene diisocyanate, 4,4'-diphenylether diisocyanate, 1,5-naphthalene diisocyanate, p-xylylene diisocyanate, m-xylylene diisocyanate, 1,3-diisocyanatomethyl cyclohexane, 1,4-diisocyanatomethyl cyclohexane, 4,4'-diisocyanatodicyclohexyl methane or isophorone diisocyanate.

The polyol component (b) comprises (i) at least one polyester polyol or polyether polyol having a molecular weight of from 400 to 10,000, preferably 800 to 3000, (ii) up to 20, preferably 0,2 to 10 moles of a diol chain lenghtening agent per mole of component (i) and (iii) a sulphonate diol of the kind described in more detail hereinafter.

Suitable polyether polyols are, for example, the known alkoxylation products of polyvalent, preferably divalent starter molecules such as water, ethylene glycol, propylene glycol, glyceral and/or trimethylol propane. For preparing the alkoxylation products alkylene oxides such as ethylene oxide and/or propylene oxide may be used. The preferred polyether polyols are the propoxylation products of difunctional starter molecules. Suitable polyester polyols are, for example, polyester diols based on adipic acid or phthalic acid and diols such as 1,4-dihydroxybutane or 1,6-dihydroxyhexane. Polycaprolactonediols may also be used. Hexanediol-(1,6)-polycarbonates having terminal hydroxyl groups are the most preferably used as component (i).

The chain lengthening diols (ii) generally have a molecular weight of from 62 to 399, preferably of from 62 to 200 and consist of diols such as ethylene glycol, propylene glycol, 1,3-propanediol, 1,4-butanediol, 1,5-pentanediol, 1,6-hexanediol, neopenthyl glycol, diethylene glycol, dipropylene glycol, 2,2,4-trimethyl-1,3-pentanediol, 1,4-Bis-(hydroxymethyl)-cyclohexane and/or ehtylene oxide and/or propylene oxide adducts of bisphenol A. Mixtures of such diols may also be used as component (ii).

Suitable sulphonate diols are compounds which contain two primary and/or secondary hydroxyl groups and at least one chemically fixed sulphonate group. Suitable sulphonate diols are, for example, compounds of the general formula

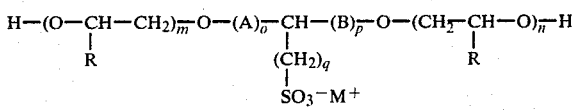

in which

A and B are the same or different divalent aliphatic hydrocarbon radicals having from 1 to 6 carbon atoms, R stands for hydrogen or for an alkyl group having from 1 to 4 carbon atoms or a phenyl radical M stands for an alkali metal atom, preferably for sodium or potassium and m and n stand for 0 and an integer up to 30, preferably up to 4, o and p stand for 0 or 1 and q stands for 0,1 or 2.

These compounds are obtained by reacting an alkali metal bisulphite in aqueous medium with an unsaturated divalent alcohol such as 2-methylene-propane-1,3-diol, 2-butene-1,4-diol or 1-butene-3,4-diol (m and n=0) or with an unsaturated divalent alcohol obtained by adding an alkylene oxide such as ethylene oxide, propylene oxide or styrene oxide to such unsaturated divalent alcohols (m and n being an integer of up to 30).

For preparing the binders in accordance with the present invention the above starting materials are reacted with each other in known manner e.g. at a temperature of about 50° to 100° C., maintaining an equivalent ratio of isocyanate groups to hydroxyl groups of from 0.5:1 to 2:1, preferably 0.8:1 to 1,2:1.

The amount of sulphonate diols is selected so that the resulting polyurethane resins contain from 10 to 200 preferably from 20 to 100, equivalents of sulphonate groups per 1000 kg.

The reaction may be carried out in the presence of auxiliaries known in polyurethane chemistry. These auxiliaries include solvents such as methylethyl ketone, methylisobutyl ketone, cyclohexanone, toluene, xylene, tetrahydrofurane, butylacetate and/or ethylacetate. Further auxiliaries which may be used are, for example, the known catalysts for the polyurethane forming reaction such as dibutyl-tin-dilaurate or tin(II)octoate. The use of such catalysts is, however, generally not necessary.

The polyurethanes generally have a molecular weight of from 5000 to 100,000. They exhibit a very good abrasion resistance and dispersing properties for the magnetic particles. The preferred polyurethanes of the invention based on hexandiol-(1,6)-polycarbonatediol exhibit, furthermore, an outstanding thermal and hydrolysis resistance.

The coating compositions which are used for the manufacture of the tapes generally consists of mixtures of the binder i.e. of polyurethanes in accordance with the invention, up to 1,600, preferably 800 to 1,600 and most preferably 1,000 to 1,400% by weight, based on the weight of the binder, of solvents such as those exemplified hereinbefore, of from 200 to 600, preferably 300 to 500% be weight, based on the weight of the binder, of magnetic particles of the type exemplified hereinbefore; and optionally, 10 to 30, preferably 15 to 20% by weight, based on the weight of the binder, of hardeners such as an adduct of toluene diisocyanate and trimethylol propane containing free isocyanate groups. It is also possible to use any other binder resin such as those exemplified hereinbefore mixed with polyurethanes in accordance with the invention, optionally in the presence of auxiliaries known in magnetic coating production such as lecithine as dispersant, lubricants, aluminum oxide as polishing agent and/or carbon black as anti-electrostatic agent etc.

In order to manufacture the coating composition it is necessary to intimately mix the components. This can, for example, be done with aid of ball mills, sand mills or paint conditioners.

The magnetic recording media are generally made by coating the base material with the coating composition in accordance with the invention using, for example, a gravure roll coater. The wet-thickness of the coating is generally in the range of from 10 to 40 μm.

The coatings are normally dried by air, optionally at elevated temperatures.

The following examples illustrate the present invention. All percentages relate to percent by weight unless otherwise indicated. All parts relate to parts by weight.

EXAMPLES 1–5 and COMPARISON EXAMPLES 1–4

In a reaction vessel equipped with thermometer, agitator and reflux condenser, 130.4 parts of polybutylene adipate (molecular weight 2000) and 149.2 part of 4,4'-diphenylmethane diisocyanate were fed and the reaction mixture was kept at 70° to 90° C. for 1 hour. About 300 parts of methyl ethyl ketone, 2.8 parts of 1,4-butanediol, 52.3 part of neopenthyl glycol and 5.3 part of propoxylated sodium bisulfite adduct of 2-butene-1,4-diol (molecular weight about 420 hereinafter metal-sulfonate 1) were added to said mixture, thereafter the mixture was kept at 70° to 90° C. for 40 to 60 hours for chain extending reaction. The thus obtained mixture was further diluted with 510 parts of methyl ehtyl ketone.

The thus obtained polyurethane resin composition (example 1) has a solids content of 32.8% and a viscosity of 230 mPas at 25° C. In the same manner further polyurethane compositions (examples 2–5 and comparison examples 1–4) were prepared by alternating polyols or chain extenders and the results are shown in the tables 1 and 2.

As metal-sulfonate 2 or 3, propoxylated sodium bisulfite adduct of 2-methylene propane-1,3-diol (molecular weight about 420) or propoxylated sodium bisulfite adduct of 1-butene-3,4-diol (molecular weight about 510) were used. The quantity of compounds shown in the tables relate to mole ratios.

40 g of magnetic powder (Co-ψ-Fe$_2$O$_3$), 10 g of the above mentioned polyurethane resin composition, 69 g of methyl ethyl ketone and 375 g of glass beads (2 mm of diameter) were charged into a vessel, and dispersed with aid of a paint conditioner (RED DEVIL) for 2 hours. The magnetic paint obtained after removing the glass beads was coated in a thickness of 30 μm using a doctor blade on a film of polyethylene terephthalate resin having 100 μm of thickness and dried by air. Smoothness of the surface was checked by rate of reflection gloss (75 deg/75deg) and the ratio of residual magnetization and saturation magnetization (Mr/Ms) was measured from the magnetic hysteresis curve.

The results are shown in the tables 1 and 2.

TABLE 1

|  | Example 1 | Example 2 | Example 3 | Example 4 | Example 5 |
|---|---|---|---|---|---|
| Poly-1,4-butylene adipate (MW = 2000) | 1 |  |  | 1 | 1 |
| Hexandiol-(1,6)-polycarbonate diol (MW = 2000) |  | 1 |  |  |  |
| Polycaprolactone diol (MW=2000) |  |  | 1 |  |  |
| 1,4-Butanediol | 0.5 | 0.5 | 0.5 | 0.5 | 0.5 |
| Neopenthylglycol | 8 | 4 | 8 | 8 | 8 |
| Metal sulfonate (1) | 0.2 | 0.2 | 0.2 |  |  |
| Metal sulfonate (2) |  |  |  | 0.2 |  |
| Metal sulfonate (3) |  |  |  |  | 0.2 |
| 4,4'-Diphenylmethane diisocyanate | 9.5 | 5.6 | 9.5 | 9.5 | 9.5 |
| Polyurethane composition | A | B | C | D | E |
| Viscosity (cps) | 230 | 380 | 400 | 800 | 700 |
| Solid content (%) | 32.8 | 30.7 | 31.2 | 31.7 | 30.0 |
| Appearance | Clear | Clear | Clear | Clear | Clear |
| Reflection gloss (%) | 98 | 96 | 96 | 97 | 97 |
| Mr/Ms | 0.86 | 0.85 | 0.85 | 0.85 | 0.85 |

TABLE 2

|  | Comparison example 1 | Comparison example 2 | Comparison example 3 | Comparison example 4 |
|---|---|---|---|---|
| Poly-1,4-butylene adipate (MW=2000) |  |  |  | 1 |
| Hexanediol-(1,6)-polycarbonate diol (MW=2000) | 1 | 1 | 1 |  |
| 1,4-Butanediol | 0.5 | 0.5 | 0.5 |  |
| Neopenthylglycol | 6 |  |  |  |
| Ethyldiethanol amine |  |  | 0.25 |  |
| Metal sulfonate (1) | 0.004 |  |  |  |
| Metal sulfonate (2) |  |  |  |  |
| Metal sulfonate (3) |  |  |  |  |
| 4,4'-Diphenylmethane diisocyanate | 7.4 | 1.5 | 1.7 | 1 |
| Polyurethane composition | F | G | H | I |
| Viscosity (mPa.s/25° C.) | 2,300 | 13,000 | 10,000 | 43,000 |
| Solid content (%) | 30.3 | 29.7 | 30.2 | 35.4 |
| Appearance | Clear | Clear | Clear | Clear |
| Reflection gloss (%) | 17 | 44 | 31 | 3 |
| Mr/Ms | 0.65 | 0.76 | 0.71 | 0.60 |

EXAMPLES 6-9 AND COMPARISON EXAMPLE 5

In a reaction vessel equipped with termometer, agitator and reflux condenser, 176.3 parts of hexanediol-(1,6)-polycarbonate (molecular weight: 2000) and 117.6 part of 4,4'-diphenylmethane diisocyanate were fed and the reaction mixture was kept at 70° to 90° C. for 1 hour. About 300 parts of methyl ethyl ketone, 3.8 parts of 1,4-butanediol, 35.1 part of neopenthyl glycol and 8.9 parts of propoxylated sodium bisulfite adduct of 1-butene-1,4-diol (molecular weight about 420; (metal sulfonate 1) were added to the said mixture, and the mixture was kept at 70° to 90° C. for 40 to 60 hours for chain extending reaction. Thus obtained mixture was further diluted with 497 parts of methyl ethyl ketone.

Thus obtained polyurethane resin composition has a solids content of 30.7% and a viscosity of 380 mPas at 25° C. (example 6). In the same manner polyurethane resin compositions (K - O) were prepared by alternating polyols or chain extenders and the results are shown in Table 3. The quantity of compounds shown in Table 3 relate to mole ratios.

40 g of magnetic powder (Co-ψ-Fe$_2$O$_3$), 10 g of the above-mentioned polyurethane resin compositions, 69 g of methyl ethyl ketone and 375 g of glass beads (2 mm of diameter) were charged into a vessel and dispersed with aid of a paint conditioner (RED DEVIL) for 2 hours. The magnetic paint obtained after removing the glass beads was coated in a thickness of 30 μm using a doctor blade on a film of polyethylene terephthalate resin having 100 μm of thickness and dried by air.

Smoothness of the surface was evaluated by rate of reflection gloss (75 deg/75 deg).

The results are shown in Table 3.

The aforementioned polyurethane resins were coated in a thickness of 30 μm using a doctor blade on a teflon resin plate. Polyurethane resin films were obtained by drying with air.

The thermal resistance of said polyurethane resin films was evaluated by the difference of mechanical strength between before and after it was heated at 100° C. for a week in an oven.

In the same way the hydrolysis resistance was evaluated by the difference of mechanical strength between before and after keeping it in an oven at 70° C. and 95% of humidity for 2 weeks. The results are shown in Table 4 the first 5 lines showing the results of the thermal resistance, the second 5 lines the results of the hydrolysis tests.

The films obtained from polyurethane resin compound O did not maintain its shape at the thermal resistance test.

TABLE 3

|  | Example 6 | Example 7 | Example 8 | Example 9 | Comparison Example 5 |
|---|---|---|---|---|---|
| Hexandiol-(1,6)-polycarbonate diol (MW = 2000) | 1 | 1 | 1 | 1 |  |
| Poly-1,4-butylene adipate (MW = 2000) |  |  |  |  | 1 |
| 1,4-Butane diol | 0.5 | 0.5 | 0.5 |  |  |
| Neopentyl glycol | 4 | 6 | 4.5 | 5 |  |
| Metal sulfonate (1) | 0.2 | 0.2 |  |  |  |
| Metal sulfonate (2) |  |  | 0.2 |  |  |
| Metal sulfonate (3) |  |  |  | 0.2 |  |
| 4,4-Diphenylmethane diisocyanate | 5.6 | 7.5 | 6.1 | 6.6 | 1 |
| Polyurethane composition | K | L | M | N | O |
| Viscosity (mPa.s/25° C.) | 380 | 5000 | 1900 | 1400 | 43000 |
| Solid content (%) | 30.7 | 31.8 | 31.2 | 30.7 | 35.4 |
| Reflection gloss (%) | 96 | 97 | 98 | 97 | 3 |

TABLE 4

| Polyurethane composition | 100% Modulus Before/After | 300% Modulus Before/After | Tensile (kg/cm²) Before/After | Elongation(%) Before/After |
| --- | --- | --- | --- | --- |
| K | 92/92 | 367/356 | 411/399 | 456/483 |
| L | 236/236 | —/— | 314/305 | 178/157 |
| M | 168/168 | —/— | 513/498 | 281/298 |
| N | 201/201 | —/— | 445/432 | 249/264 |
| O | 20/* | 70/* | 450/* | 700/* |
| K | 92/87 | 367/ | 411/378 | 456/470 |
| L | 236/224 | —/— | 314/289 | 178/183 |
| M | 168/160 | —/— | 513/472 | 281/289 |
| N | 201/191 | —/— | 445/409 | 249/256 |
| O | 20/12 | 70/41 | 450/207 | 700/861 |

What is claimed is:

1. A binder composition comprising a polyurethane resin obtained by reacting
   (a) a polyisocyanate component with
   (b) a polyol component comprising
       (i) a hexane diol-1,6-polycarbonate having terminal hydroxyl groups and having a molecular weight of from 400 to 10,000,
       (ii) a sulfonate-free diol chain extender which has a molecular weight of from 62 to 399, and
       (iii) a diol containing chemically bonded sulphonate groups of the formula

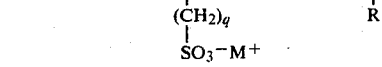

wherein
A and B are the same or different divalent aliphatic hydrocarbon radicals having from 1 to 6 carbon atoms;
R is hydrogen, alkyl having from 1 to 4 carbon atoms or phenyl; M is an alkali metal atom;
m and n are 0 or an integer up to 30;
o and p are 0 or 1, and
q is 0, 1 or 2;
and wherein the amount of reactant (iii) is an amount such that the resulting polyurethane contains from 10-200 equivalents of sulphonate groups per 1,000 kilograms.

2. In an improved magnetic recording medium containing a base material, magnetic particles and a binder, the improvement comprises said binder being the binder composition in accordance with claim 1.

3. A process for preparing a magnetic recording medium which comprises coating a base material with a coating material comprising (i) an organic solvent, (II) a polyurethane binder and (III) magnetic particles, characterized in that the polyurethane binder is a binder composition in accordance with claim 1.

* * * * *